United States Patent [19]
Le-Khac

[11] Patent Number: 5,714,428
[45] Date of Patent: *Feb. 3, 1998

[54] DOUBLE METAL CYANIDE CATALYSTS CONTAINING FUNCTIONALIZED POLYMERS

[75] Inventor: Bi Le-Khac, West Chester, Pa.

[73] Assignee: Arco Chemical Technology, L.P., Greenville, Del.

[*] Notice: The term of this patent shall not extend beyond the expiration date of Pat. No. 5,426,081.

[21] Appl. No.: 731,495

[22] Filed: Oct. 16, 1996

[51] Int. Cl.$^6$ .............. B01J 31/00; B01J 31/02; B01J 31/06
[52] U.S. Cl. .............. 502/159; 502/175; 502/200
[58] Field of Search .............. 502/159, 175, 502/200

[56] References Cited

U.S. PATENT DOCUMENTS

| | | |
|---|---|---|
| 3,278,457 | 10/1966 | Milgrom . |
| 3,278,458 | 10/1966 | Belner . |
| 3,404,109 | 10/1968 | Milgrom . |
| 3,427,256 | 2/1969 | Milgrom . |
| 3,538,043 | 11/1970 | Herold . |
| 3,829,505 | 8/1974 | Herold . |
| 3,900,518 | 8/1975 | Milgrom . |
| 3,941,849 | 3/1976 | Herold . |
| 4,472,560 | 9/1984 | Kuyper et al. ............ 526/120 |
| 5,145,883 | 9/1992 | Saito et al. ............ 521/172 |
| 5,158,922 | 10/1992 | Hinney et al. ............ 502/175 |
| 5,223,583 | 6/1993 | Higuchi et al. ............ 525/404 |
| 5,426,081 | 6/1995 | Le-Khac ............ 502/154 |
| 5,470,813 | 11/1995 | Le-Khac ............ 502/175 |
| 5,482,908 | 1/1996 | Le-Khac ............ 502/156 |
| 5,498,583 | 3/1996 | Le-Khac ............ 502/154 |
| 5,525,565 | 6/1996 | Le-Khac ............ 502/159 |
| 5,545,601 | 8/1996 | Le-Khac ............ 502/156 |

FOREIGN PATENT DOCUMENTS 3245848  11/1991  Japan .

OTHER PUBLICATIONS

J.L. Schuchardt & S.D. Harper, Proceedings of the SPI, 32nd Annual Polyurethane Tech/Market, Conf. Oct. 1989, p. 360.

*Primary Examiner*—Elizabeth Wood
*Attorney, Agent, or Firm*—Jonathan L. Schuchardt

[57] ABSTRACT

Double metal cyanide (DMC) catalysts useful for epoxide polymerizations are disclosed. The catalysts comprise a DMC compound, an organic complexing agent, and from about 2 to about 80 wt. % of a functionalized polymer or a water-soluble salt derived from the polymer. The catalysts are easy to prepare and isolate, are substantially non-crystalline, and have high activity for polymerizing epoxides. Polyols made from the catalysts have exceptionally low unsaturations, low viscosities, and reduced levels of high molecular weight polyol tail.

8 Claims, 3 Drawing Sheets

DOUBLE METAL CYANIDE CATALYSTS CONTAINING FUNCTIONALIZED POLYMERS

FIELD OF THE INVENTION

The invention relates to double metal cyanide (DMC) catalysts useful for epoxide polymerization. In particular, the invention relates to DMC catalysts that have high activity, are substantially non-crystalline, and which contain a functionalized polymer. The catalysts are especially valuable for making low-unsaturation polyether polyols useful in the polyurethane industry.

BACKGROUND OF THE INVENTION

Double metal cyanide complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. These polyols are useful in polyurethane coatings, elastomers, sealants, foams, and adhesives.

DMC catalysts are usually made by reacting aqueous solutions of metal salts and metal cyanide salts to form a precipitate of the DMC compound. A low molecular weight organic complexing agent, typically an ether or an alcohol is included in the catalyst preparation. The organic complexing agent is needed for favorable catalyst activity. Preparation of typical DMC catalysts is described, for example, in U.S. Pat. Nos. 3,427,256, 3,829,505, and 5,158,922.

For decades, DMC catalysts having a relatively high degree of crystallinity were used for making epoxide polymers. The most popular catalyst contained an organic complexing agent (usually glyme), water, some excess metal salt (typically zinc chloride) and the DMC compound (see FIG. 2). Activity for epoxide polymerization, which exceeded the activity available from the commerical standard (KOH), was thought to be adequate. Later, it was appreciated that more active catalysts would be valuable for successful commercialization of polyols from DMC catalysts.

We recently described substantially amorphous DMC catalysts that have exceptional activity for polymerizing epoxides (see U.S. Pat. No. 5,470,813). We also described highly active DMC catalysts that include, in addition to a low molecular weight organic complexing agent, from about 5 to about 80 wt. % of a polyether such as a polyoxypropylene polyol (see U.S. Pat. Nos. 5,482,908 and 5,545,601). Compared with earlier DMC catalysts, the DMC catalysts described in U.S. Pat. Nos. 5,470,813, 5,482,908, and 5,545, 601 have excellent activity and give polyether polyols with very low unsaturations. The catalysts are active enough to allow their use at very low concentrations, often low enough to overcome any need to remove the catalyst from the polyol.

The most active DMC catalysts now known generally have relatively low degrees of crystallinity. Homogenizing the reactants to efficiently incorporate organic complexing agent into the catalyst framework or including a polyether (usually a polyether polyol) in the catalyst preparation results in highly active DMC catalysts. Powder X-ray diffraction analysis of these types of catalysts reveals a substantially non-crystalline catalyst (see FIG. 1).

Even the best DMC catalysts known could be improved. For example, the catalyst of U.S. Pat. No. 5,470,813 tends to give polyols with a high level of high molecular weight polyol tail and/or gel formation if the polyol is made under "stressed" conditions (e.g., fast epoxide addition, very low catalyst concentration). Gel formation fouls reactors. High molecular weight polyol tail can also contribute to unacceptably high polyol viscosities and difficulty with polyurethane foam processing.

Catalyst preparation can be improved. Most DMC catalysts known in the art are fine particles that tend to clog filters and therefore require centrifugation to isolate the catalyst (see, e.g., U.S. Pat. No. 5,470,813). Preferably, the catalyst could be more easily washed and isolated by a simple filtration. In addition, most DMC catalysts are dried to a solid cake prior to use, and the cake must be crushed with considerable force to produce a free-flowing powder (see, e.g., Jap. Pat. Appl. Kokai No. 3-245848). The need to pulverize DMC catalysts COSTS considerable time and effort.

In sum, new DMC catalysts are needed. Preferably, the catalysts would be substantially non-crystalline and highly active. Preferably, the catalysts would be easy to isolate during preparation by simple filtration, and would dry to an easily crushed cake. An ideal catalyst would give polyether polyols with low unsaturation, a reduced amount of high molecular weight polyol tail, and reduced problems with gel formation and reactor fouling. An ideal catalyst would be active enough to use at very low concentrations, preferably at concentrations low enough to overcome any need to remove the catalyst from the polyol.

SUMMARY OF THE INVENTION

The invention is a double metal cyanide (DMC) catalyst useful for epoxide polymerizations. The catalyst comprises a DMC compound, an organic complexing agent, and from about 2 to about 80 wt. % of a functionalized polymer or a water-soluble salt derived from the polymer. The invention also includes a method for making the catalysts, and a process for making epoxide polymers using the catalysts.

I surprisingly found that DMC catalysts that include a functionalized polymer as defined below are substantially non-crystalline and also have high activity for polymerizing epoxides. The activities are comparable to those already reported for DMC catalysts that incorporate polyethers (see U.S. Pat. Nos. 5,482,908 and 5,545,601), and are generally higher than the activities of comparable catalysts made in the absence of the functionalized polymer.

Catalysts of the invention are easily isolated during preparation by simple filtration, thus avoiding the need for centrifugation. In addition, dried catalysts of the invention are easily reduced to free-flowing powders without the need for crushing or pulverizing under great force.

Polymerization of epoxides with the catalysts of the invention produces polyols having very low unsaturations. In addition, polyols made from catalysts of the invention contain reduced levels of high molecular weight polyol tail, and reduced problems with gel formation and reactor fouling, even when the polyol is made under stressed conditions.

Apparently, a key to making highly active DMC catalysts is to inhibit formation of highly crystalline forms of the catalyst. Incorporation into the catalyst of a functionalized polymer produces a substantially non-crystalline catalyst that is easy to prepare and isolate, is highly active, and gives high-quality polyether polyols.

DETAILED DESCRIPTION OF THE INVENTION

Figure 1:
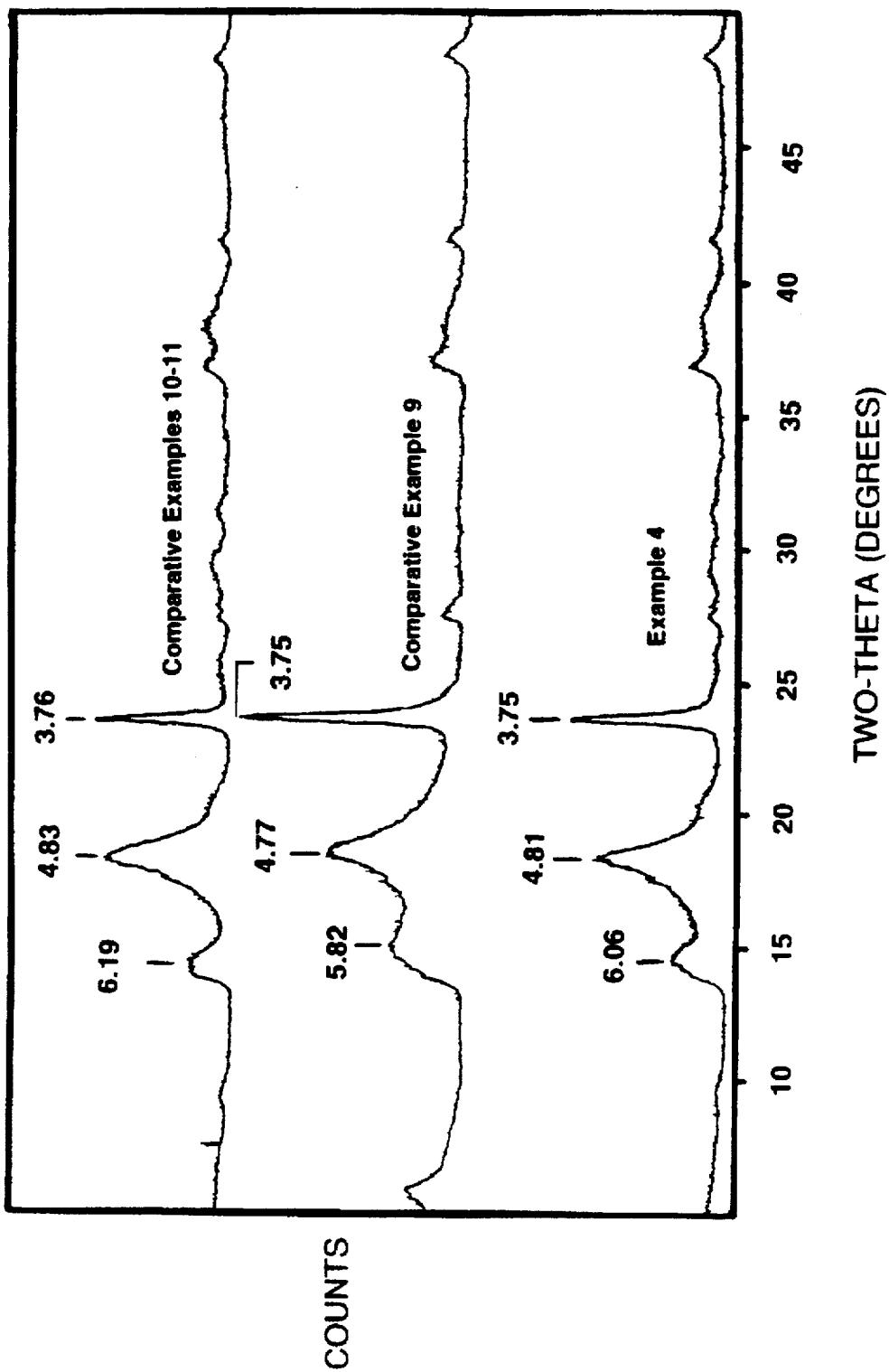
FIG. 1 shows powder X-ray diffraction patterns for a catalyst of the invention (from Example 4), a polyether-containing DMC catalyst prepared as in U.S. Pat. No. 5,482,908 (see Comparative Example 9), and a substantially amorphous catalyst made in the absence of a functionalized polymer additive as prepared in U.S. Pat. No. 5,470,813 (see Comparative Examples 10 and 11).

Catalysts of the invention comprise a double metal cyanide (DMC) compound, an organic complexing agent, and from about 2 to about 80 wt. % of a functionalized polymer or a water-soluble salt of the polymer.

Double metal cyanide compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel (II) nitrate, and the like, and mixtures thereof.

The water-soluble metal cyanide salts used to make the double metal cyanide compounds useful in the invention preferably have the general formula $(Y)_aM'(CN)_b(A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt (II) hexacyanocobaltate(III), and the like. Further examples of suitable double metal cyanide compounds are listed in U.S. Pat. No. 5,158,922, the teachings of which are incorporated herein by reference.

The DMC catalysts of the invention include an organic complexing agent. Generally, the complexing agent is relatively soluble in water. Suitable complexing agents are those commonly known in the art, as taught, for example, in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is most preferred.

A key component of the DMC catalysts of the invention is a functionalized polymer or its water-soluble salt. By "functionalized polymer" we mean a polymer, other than a polyether, that contains one or more functional groups containing oxygen, nitrogen, sulfur, phosphorus, or halogen, wherein the polymer, or a water-soluble salt derived from it, has relatively good water solubility, i.e., at least about 3 wt. % of the polymer or its salt dissolves at room temperature in water or mixtures of water with a water-miscible organic solvent. Examples of water-miscible organic solvents are tetrahydrofuran, acetone, acetonitrile, t-butyl alcohol, and the like. Water solubility is important for incorporating the functionalized polymer into the catalyst structure during formation and precipitation of the double metal cyanide compound.

Preferred functionalized polymers have the general structure:

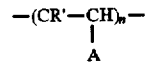

in which R' is hydrogen, —COOH, or a $C_1$-$C_5$ alkyl group, and A is one or more functional groups selected from the group consisting of —OH, —NH$_2$, —NHR, —NR$_2$, —SH, —SR, —COR, —CN, —Cl, —Br, —C$_6$H$_4$—OH, —C$_6$H$_4$—C(CH$_3$)$_2$OH, —CONH$_2$, —CONHR, —CO—NR$_2$, —OR, —NO$_2$, —NHCOR, —NRCOR, —COOH, —COOR, —CHO, —OCOR, —COO—R—OH, —SO$_3$H, —CONH—R—SO$_3$H, pyridinyl, and pyrrolidonyl, in which R is a $C_1$-$C_5$ alkyl or alkylene group, and n has a value within the range of about 5 to about 5,000. More preferably, n is within the range of about 10 to about 500.

Optionally, the polymer also includes recurring units derived from a non-functionalized vinyl monomer such as an olefin or diene, e.g., ethylene, propylene, butylenes, butadiene, isoprene, styrene, or the like, provided that the polymer or a salt derived from it has relatively good solubility in water or mixtures of water and a water-miscible organic solvent.

Suitable functionalized polymers include, for example, poly(acrylamide), poly(acrylamide-co-acrylic acid), poly (acrylic acid), poly(2-acrylamido-2-methyl-1-propanesulfonic acid), poly(acrylic acid-co-maleic acid), poly(acrylonitrile), poly(alkyl acrylate)s, poly(alkyl methacrylate)s, poly(vinyl methyl ether), poly(vinyl ethyl ether), poly(vinyl acetate), poly(vinyl alcohol), poly(N-vinylpyrrolidone), poly(N-vinylpyrrolidone-co-acrylic acid), poly(N, N-dimethylacrylamide), poly(vinyl methyl ketone), poly(4-vinylphenol), poly(4-vinylpyridine), poly (vinyl chloride), poly(acrylic acid-co-styrene), poly(vinyl sulfate), poly(vinyl sulfate) sodium salt, and the like.

In other preferred catalysts of the invention, the functionalized polymer is selected from the group consisting of polyesters, polycarbonates, oxazoline polymers, polyalkylenimines, maleic acid and maleic anhydride copolymers, hydroxyethyl cellulose, starches, and polyacetals. Thus, the functionalized polymer can be, for example, poly(ethylene glycol adipate), poly(dipropylene glycol adipate), poly(1,6-hexanediol carbonate), poly(2-ethyl-2-oxazoline), poly(vinyl butyral-co-vinyl alcohol-co-vinyl acetate), and the like, and salts thereof.

Catalysts of the invention contain from about 2 to about 80 wt. % (based on the total amount of catalyst) of the functionalized polymer. Preferably, the catalysts contain from about 5 to about 70 wt. % of the polymer; most preferred is the range from about 10 to about 60 wt. %. At least about 2 wt. % of the polymer is needed to significantly improve the catalyst activity compared with a catalyst made in the absence of the polymer. Catalysts that contain more than about 80 wt. % of the polymer are generally no more active, and they are often difficult to isolate.

The molecular weight of the functionalized polymer can vary over a fairly wide range. Preferably, the number average molecular weight is within the range of about 300 to about 500,000; a more preferred range is from about 500 to about 50,000.

Figure 2:
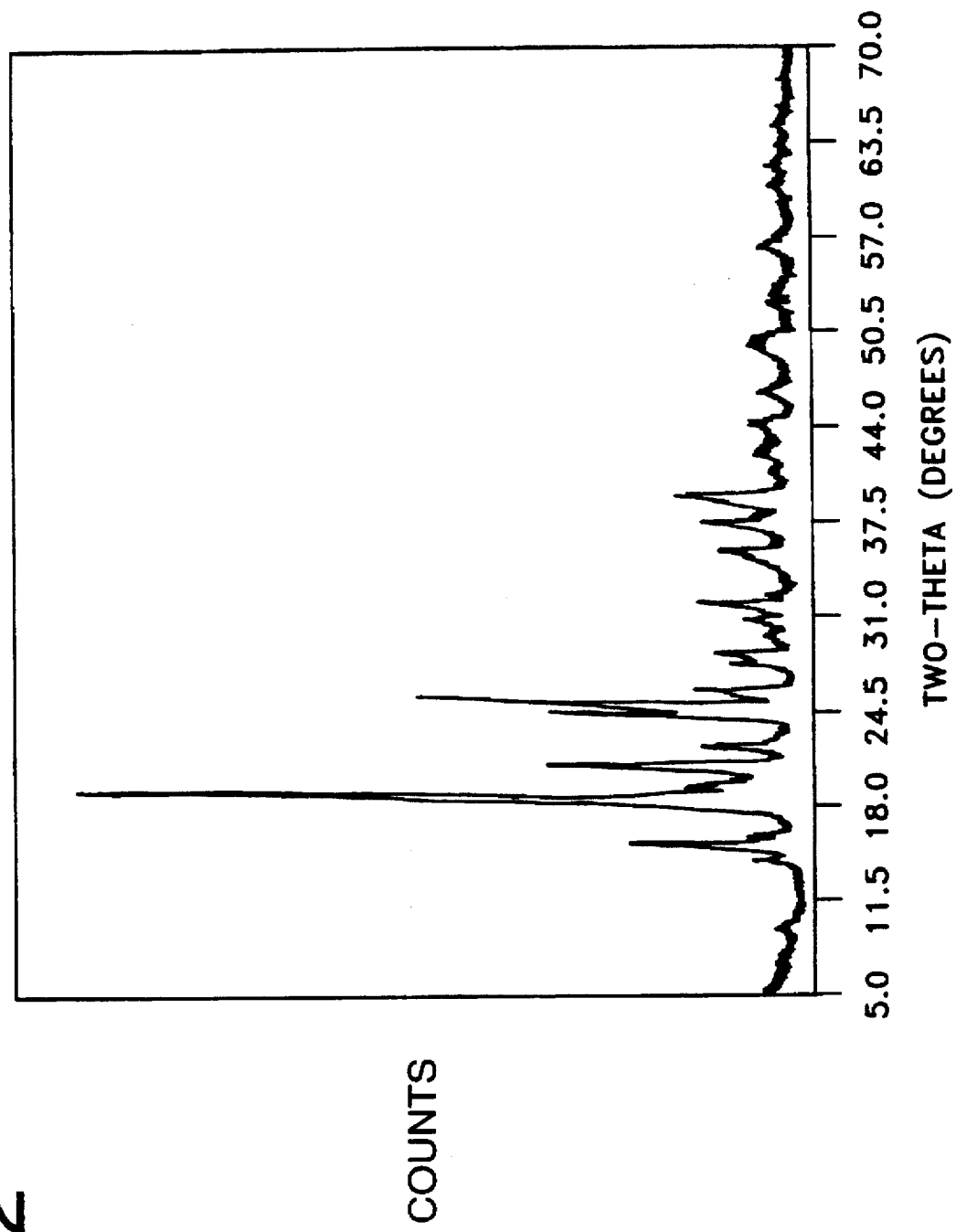
FIG. 2 shows a conventional zinc hexacyanocobaltate-glyme catalyst.
Figure 3:
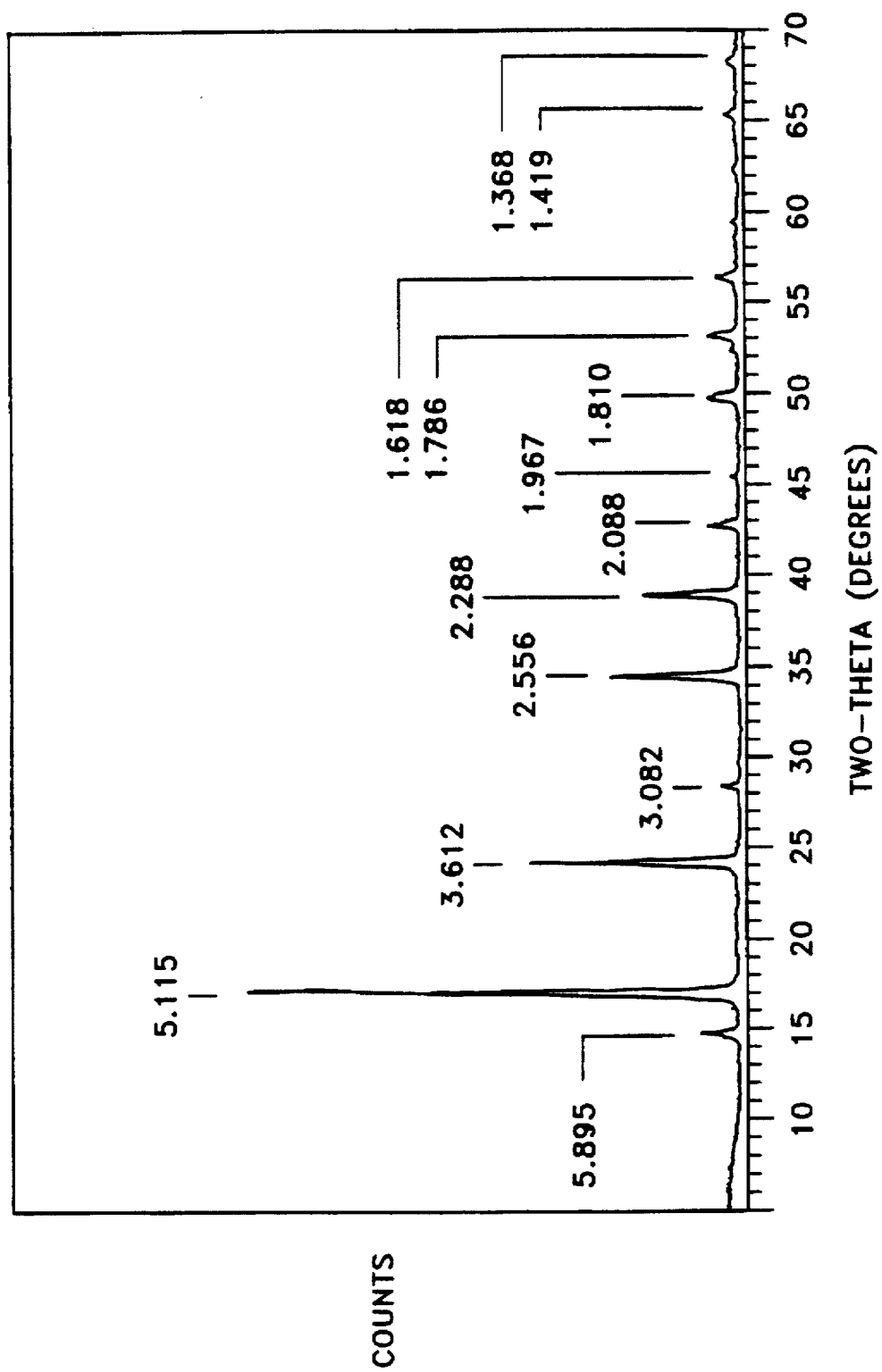
FIG. 3 shows a zinc hexacyanocobaltate made without a complexing agent.

I surprisingly found that DMC catalysts that include the functionalized polymers described above are substantially non-crystalline and also have high activity for polymerizing epoxides. By "substantially non-crystalline," we mean lacking a well-defined crystal structure, or characterized by the substantial absence of sharp lines in the powder X-ray diffraction pattern of the composition. Conventional zinc hexacyanocobaltate-glyme catalysts (such as those described in U.S. Pat. No. 5,158,922) show a powder X-ray diffraction pattern containing many sharp lines, which indicates that the catalyst has a high degree of crystallinity (see FIG. 2). Zinc hexacyanocobaltate prepared in the absence of a complexing agent is also highly crystalline (see FIG. 3). In contrast, catalysts of the invention, like those described in U.S. Pat. Nos. 5,470,813 and 5,482,908, are substantially non-crystalline (see FIG. 1 and Comparative Examples 9–11).

Activities of catalysts of the invention are comparable to those already reported for DMC catalysts that incorporate polyethers (see U.S. Pat. Nos. 5,482,908 and 5,545,601), and are generally higher than the activities of comparable catalysts made in the absence of the functionalized polymer. As Table 1 (below) shows, catalysts of the invention have activities greater than about 15 g PO/min. at 20–25 ppm catalyst and 105° C. compared with less than 10 g PO/min. at 20 ppm for a catalyst prepared in the absence of the functionalized polymer.

Like the catalysts of U.S. Pat. Nos. 5,470,813 and 5,482,908, those of the invention are substantially non-crystalline or amorphous. In fact, the powder X-ray diffraction patterns for catalysts of the invention are remarkably similar to those we described in those earlier patents. The teachings of U.S. Pat. Nos. 5,470,813 and 5,482,908 related to catalyst characterization by powder X-ray diffraction are incorporated herein by reference.

Catalysts of the invention are characterized by the substantial absence of sharp lines and relatively few signals. FIG. 1 shows powder X-ray diffraction patterns for a catalyst of the invention (containing poly(vinyl methyl ether) as the functionalized polymer, see Example 4), a polyether-containing DMC catalyst as described in U.S. Pat. No. 5,482,908 (see Comparative Example 9), and a substantially amorphous DMC catalyst containing no polymer additive as described in U.S. Pat. No. 5,470,813 (see Comparative Examples 10 and 11). As the figures demonstrate, the traces are remarkably similar in spite of the presence or absence of a polymer additive, and in spite of profound differences in the kind of polymer additive (polyether or functionalized polymer). The exact position of the peaks depends somewhat on the amount of functionalized polymer, the nature of the polymer, and the nature of the organic complexing agent. Generally, the degree of crystallinity decreases with increasing functionalized polymer contents.

Preferred catalysts of the invention exhibit a single relatively sharp powder X-ray diffraction peak at a d-spacing of about 3.7 to about 3.8 angstroms, which corresponds to an angle of about 23 to about 24 degrees two theta. This peak has a crystallite size of about 280 angstroms, which corresponds to a full-width half-max (FWHM) value of about 0.3. In preferred catalysts, the rest of the X-ray diffraction pattern is substantially non-crystalline; two additional major broader peaks centered around d-spacings of about 4.7 to 4.9 angstroms (about 18 to 19 degrees two theta) and about 5.8 to 6.2 angstroms (about 13 to 15 degrees two theta) dominate the pattern. Additional, much smaller non-crystalline peaks are usually present. FIG. 1 shows a preferred catalyst of the invention (functionalized polymer=poly(vinyl methyl ether), see Example 4) that has powder X-ray diffraction peaks at d-spacing (angstroms): 3.75, 4.81, and 6.06.

Catalysts of the invention are easily isolated during preparation by simple filtration, thus avoiding the need for centrifugation. As the examples below demonstrate, a simple pressure filtration can be used when the catalyst is washed and isolated. As Comparative Examples 10 and 11 show, catalyst isolation in the absence of a functionalized polymer requires the more difficult centrifugation routine.

Dried catalysts of the invention are easily reduced to free-flowing powders without the need for crushing or pulverizing under great force. This contrasts with most DMC catalysts, which are commonly dried to a cake and then crushed to make a powder. As shown in Comparative Examples 10 and 11 and Jap. Pat. Appl. Kokai No. 3-245848, a difficult crushing step is normally required to convert a dried DMC catalyst filter cake to powder. Catalysts of the invention are easily reduced to free-flowing powders.

Polymerization of epoxides with the catalysts of the invention produces polyols having very low unsaturations. As Table 1 shows, typical unsaturation levels for an 8000 mol. wt. poly(oxypropylene) diol made under stressed conditions at 130° C. are 0.004 to 0.007 meq/g. Polyols made from catalysts of the invention contain reduced levels of high molecular weight polyol tail, and reduced problems with gel formation and reactor fouling, even when the polyol is made under stressed conditions such as low catalyst concentration and fast epoxide addition. As Table 1 shows, a catalyst made without a functionalized polymer additive, when used under stressed conditions of 20 ppm catalyst and 2-hour addition time for propylene oxide (see Comparative Example 11), gives a polyol with unacceptably high viscosity (17000 cps), a relatively high content of high molecular weight polyol tail (9260 ppm of polyol having a peak molecular weight greater than 100,000), and significant reactor fouling from gel formation. Catalysts of the invention overcome these problems by giving polyols with low viscosities, low contents of high molecular weight tail, and no reactor fouling even under stressed conditions.

Apparently, a key to making highly active DMC catalysts is to inhibit formation of highly crystalline forms of the catalyst. While DMC catalysts having a relatively high degree of crystallinity have been used for decades for making epoxide polymers, it has now become clear that DMC catalysts having relatively low crystallinity are more desirable. The invention provides a general route to substantially non-crystalline catalysts. Incorporation into the catalyst of a functionalized polymer produces a substantially non-crystalline catalyst that is easy to prepare and isolate, is highly active, and gives high-quality polyether polyols.

The invention includes a method for making the catalysts. The method comprises reacting aqueous solutions of a metal salt and a metal cyanide salt in the presence of an organic complexing agent and the functionalized polymer.

In a typical method, aqueous solutions of a metal salt (such as zinc chloride) and a metal cyanide salt (such as potassium hexacyanocobaltate) are first reacted in the presence of an organic complexing agent (such as tert-butyl alcohol) and the functionalized polymer using efficient mixing to produce a catalyst slurry. The metal salt is used in excess. The catalyst slurry contains the reaction product of the metal salt and metal cyanide salt, which is the double metal cyanide compound. Also present are excess metal salt, water, organic complexing agent and functionalized polymer; each is incorporated to some extent in the catalyst structure.

The reactants are combined at any desired temperature. Preferably, the catalyst is prepared at a temperature within the range of about room temperature to about 80° C.; a more preferred range is from about 35° C. to about 60° C.

The organic complexing agent and functionalized polymer can be included with either or both of the the aqueous salt solutions, or they can be added to the catalyst slurry immediately following precipitation of the DMC compound. It is generally preferred to pre-mix the complexing agent with either aqueous solution, or both, before combining the reactants. If the complexing agent is added to the catalyst precipitate instead, then the reaction mixture should be mixed efficiently with a homogenizer or a high-shear stirrer to produce the most active form of the catalyst. It is generally preferred to add the functionalized polymer following precipitation of the DMC compound. The polymer-containing catalyst is then usually isolated from the catalyst slurry by any convenient means, such as filtration, centrifugation, decanting, or the like.

The isolated polymer-containing solid catalyst is preferably washed with an aqueous solution that contains additional organic complexing agent and/or additional functionalized polymer. After the catalyst has been washed, it is usually preferred to dry it under vacuum until the catalyst reaches a constant weight. Suitable techniques for washing and isolating the catalyst are described in U.S. Pat. No. 5,482,908, the teachings of which are incorporated herein by reference.

The invention includes a process for making an epoxide polymer. This process comprises polymerizing an epoxide in the presence of a double metal cyanide catalyst of the invention. Preferred epoxides are ethylene oxide, propylene oxide, butene oxides, styrene oxide, and the like, and mixtures thereof. The process can be used to make random or block copolymers. The epoxide polymer can be, for example, a polyether polyol derived from the polymerization of an epoxide in the presence of a hydroxyl group-containing initiator.

Other monomers that will copolymerize with an epoxide in the presence of a DMC compound can be included in the process of the invention to make other types of epoxide polymers. Any of the copolymers known in the art made using conventional DMC catalysts can be made with the catalysts of the invention. For example, epoxides copolymerize with oxetanes (as taught in U.S. Patent Nos. 3,278, 457 and 3,404,109) to give polyethers, or with anhydrides (as taught in U.S. Pat. Nos. 5,145,883 and 3,538,043) to give polyester or polyetherester polyols. The preparation of polyether, polyester, and polyetherester polyols using double metal cyanide catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, *SPI Proceedings, 32nd Annual Polyurethane Tech./Market. Conf.* (1989) 360. The teachings of these U.S. patents related to polyol synthesis using DMC catalysts are incorporated herein by reference in their entirety.

Polyether polyols (or monols) made with the catalysts of the invention preferably have average hydroxyl functionalities from about 1 to 8, more preferably from about 2 to 6, and most preferably from about 2 to 3. The polyols preferably have number average molecular weights within the range of about 500 to about 50,000. A more preferred range is from about 1,000 to about 12,000; most preferred is the range from about 2,000 to about 8,000.

The following examples merely illustrate the invention. Those skilled in the art will recognize many variations that are within the spirit of the invention and scope of the claims.

EXAMPLE 1

Catalyst Preparation: Zinc Hexacyanocobaltate/t-butyl alcohol Complex Containing Poly(N, N-dimethylacrylamide)

A 5.0 wt. % solution of poly(N,N-dimethylacrylamide) in distilled water is prepared (Solution 1). Zinc chloride (75 g) is dissolved in distilled water (275 mL) and t-butyl alcohol (50 mL) to give Solution 2. Fifty grams of Solution 1 is added to the zinc chloride solution. Solution 3 is made by dissolving potassium hexacyanocobaltate (7.5 g) in distilled water (100 mL). Solution 3 is added to the zinc chloride/ poly(N,N-dimethylacrylamide) mixture over 30 min. while homogenizing the mixture at 20% of the maximum mixing intensity. The reaction temperature is kept at 50° C. during the course of the reaction with an internal coil for heating or cooling. Mixing intensity is increased to 40% for the next 10 min. of mixing. The mixture is pressure filtered through a 5 micron filter at 40 psig. The filter cake is reslurried in a mixture of t-butyl alcohol (200 mL) and distilled water (70 mL), the mixture is homogenized at 40% intensity for 10 min., and is then pressure filtered as described above. The solids are reslurried in t-butyl alcohol (185 mL), and the washing and isolation process is repeated. The filter cake is dried in a vacuum oven at 60° C. to constant weight. The dried catalyst is easily crushed to a free-flowing powder. The catalyst contains 24 wt. % of poly(N,N-dimethylacrylamide). Catalyst activity for propylene oxide polymerization is 23.8 g PO/min. at 100 ppm catalyst.

EXAMPLE 2

Catalyst Preparation: Zinc Hexacyanocobaltate/t-butyl alcohol Complex Containing Poly(1-vinylpyrrolidone)

Zinc chloride (75 g) is dissolved in distilled water (275 mL) and t-butyl alcohol (50 mL) to give Solution 1. Potassium hexacyanocobaltate (7.5 g) is dissolved in distilled water (100 mL) to give Solution 2. Solution 3 is prepared by dissolving poly(1-vinylpyrrolidone) (8.0 g) in water (50 mL) and t-butyl alcohol (2.0 mL). Solution 2 is added to solution 1 over 30 min. while homogenizing the mixture at 20% of maximum mixing intensity. Reaction temperature is maintained at 50° C. during the addition. Mixing intensity is increased to 40% for the next 10 min. of mixing. The homogenizer is stopped. Solution 3 is added to the mixture, which is stirred magnetically for 3 min., and is then pressure filtered through a 20 micron filter at 40 psig. The filter cake is reslurried in t-butyl alcohol (130 mL) and distilled water (55 mL), and the mixture is homogenized for 10 min. at 40% intensity. The homogenizer is stopped. More poly(1-vinylpyrrolidone) (2.0 g) is added, and the mixture is stirred magnetically for 3 min., then pressure filtered as described above. The filter cake is reslurried in t-butyl alcohol (185 mL) and is homogenized at 40% intensity for 10 min. The homogenizer is stopped. More poly(1-vinylpyrrolidone) (1.0 g) is added, and mixing, filtration, and isolation of the catalyst solids proceeds as previously described. The cake is dried under vacuum at 60° C. to constant weight. The dried catalyst is easily crushed to a free-flowing powder. The catalyst contains 22 wt. % of poly(1-vinylpyrrolidone). Catalyst activity for propylene oxide polymerization is 12.2 g PO/min. at 25 ppm catalyst.

EXAMPLE 3

Catalyst Preparation: Zinc Hexacyanocobaltate/t-butyl alcohol Complex Containing Poly(1-vinylpyrrolidone-co-acrylic acid)

Zinc chloride solution (62.5 wt. % in water, 120 g) is combined with distilled water (230 mL) and t-butyl alcohol (50 mL) to give Solution 1. Potassium hexacyanocobaltate (7.5 g) is dissolved in distilled water (100 mL) to give Solution 2. Solution 3 is prepared by dissolving poly(1-vinylpyrrolidone-co-acrylic acid) (8.0 g) in water (50 mL) and t-butyl alcohol (2.0 mL). Solution 2 is added to solution 1 over 30 min. at 50° C. while homogenizing the mixture at 20% of maximum mixing intensity. Mixing intensity is increased to 40% for the next 10 min. of mixing. The homogenizer is stopped. Solution 3 is added to the mixture, which is stirred magnetically for 3 min., and is then pressure filtered through a 20 micron filter at 40 psig. The filter cake is reslurried in t-butyl alcohol (130 mL) and distilled water (55 mL), and the mixture is homogenized for 10 min. at 40% intensity. The homogenizer is stopped. The mixture is pressure filtered as described above. The filter cake is reslurried in t-butyl alcohol (185 mL) and is homogenized at 40% intensity for 10 min. The homogenizer is stopped. Filtration and isolation of the catalyst solids proceeds as previously described. The cake is dried under vacuum at 60° C. to constant weight. The dried catalyst is easily crushed to a free-flowing powder. The catalyst contains 24 wt. % of poly(1-vinylpyrrolidone-coacrylic acid). Catalyst activity for propylene oxide polymerization is 17.2 g PO/min. at 20 ppm catalyst.

EXAMPLE 4

Catalyst Preparation: Zinc Hexacyanocobaltate/t-butyl alcohol Complex Containing Poly(vinyl methyl ether)

An 8.0 wt. % solution of poly(vinyl methyl ether) in distilled water is prepared (Solution 1). Zinc chloride (37.5 g) and ten grams of Solution 1 are combined with distilled water (137.5 mL) and t-butyl alcohol (25 mL) to produce Solution 2. Solution 3 is prepared by dissolving potassium hexacyanocobaltate (3.75 g) in distilled water (50 mL). Solution 4 is prepared by mixing seventeen grams of Solution 1 with t-butyl alcohol (1.0 mL). Solution 3 is added to Solution 2 over 15 min. at 50° C. while homogenizing the mixture at 20% of maximum mixing intensity. Mixing intensity is increased to 40% for the next 10 min. of mixing. The homogenizer is stopped. Solution 4 is added to the mixture, which is stirred magnetically for 3 min., and is then pressure filtered through a 20 micron filter at 40 psig. The filter cake is reslurried in t-butyl alcohol (65 mL) and distilled water (27.5 mL), and the mixture is homogenized for 10 min. at 40% intensity. The homogenizer is stopped. Additional aqueous poly(vinyl methyl ether) (13.5 g of Solution 1) is added, and the mixture is stirred magnetically for 3 min. The mixture is pressure filtered as described above. The filter cake is reslurried in t-butyl alcohol (92.5 mL) and is homogenized at 40% intensity for 10 min. The homogenizer is stopped. Filtration and isolation of the catalyst solids proceeds as previously described. The cake is dried under vacuum at 60° C. to constant weight. The dried catalyst is easily crushed to a free-flowing powder. The catalyst contains 8.0 wt. % of poly(vinyl methyl ether). Catalyst activity for propylene oxide polymerization is 25 g PO/min. at 25 ppm catalyst. FIG. 1 shows a powder X-ray diffraction pattern for this catalyst.

EXAMPLE 5

Catalyst Preparation: Zinc Hexacyanocobaltate/t-butyl alcohol Complex Containing Poly(vinyl methyl ether) and Polyether Diol Zinc chloride (75 g) and poly(vinyl methyl ether) (3.0 g) are dissolved in distilled water (275 mL) and t-butyl alcohol (60 mL) to give Solution 1. Solution 2 is made by dissolving potassium hexacyanocobaltate (7.5 g) in distilled water (100 mL). Solution 3 is made by dissolving poly(oxypropylene) diol (1000 molecular weight, 8.0 g) in distilled water (50 mL) and t-butyl alcohol (2.0 mL). Solution 2 is added to Solution 1 over 30 min. at 50° C. while homogenizing the mixture at 20% of maximum mixing intensity. Mixing intensity is increased to 40% for the next 10 min. of mixing. The homogenizer is stopped. Solution 3 is added to the mixture, which is stirred magnetically for 3 min., and is then pressure filtered through a 20 micron filter at 40 psig. The filter cake is reslurried in t-butyl alcohol (130 mL), distilled water (155 mL), and poly(vinyl methyl ether) (1.0 g), and the mixture is homogenized for 10 min. at 40% intensity. The homogenizer is stopped. Additional 1000 mol. wt. poly(oxypropylene) diol (2.0 g) is added, and the mixture is stirred magnetically for 3 min. The mixture is pressure filtered as described above. The filter cake is reslurried in t-butyl alcohol (185 mL) and poly(vinyl methyl ether) (1.0 g), and is homogenized at 40% intensity for 10 min. The homogenizer is stopped. Additional 1000 mol. wt. poly(oxypropylene) diol (1.0 g) is added, and the mixture is stirred magnetically for 3 min. Filtration and isolation of the catalyst solids proceeds as previously described. The cake is dried under vacuum at 60° C. to constant weight. The dried catalyst is easily crushed to a free-flowing powder. The catalyst contains 20 wt. % of poly(vinyl methyl ether) and poly(oxypropylene) diol combined. Catalyst activity for propylene oxide polymerization is 17.9 g PO/min. at 25 ppm catalyst.

EXAMPLE 6

Catalyst Preparation: Zinc Hexacyanocobaltate/t-butyl alcohol Complex Containing Poly(vinyl ethyl ether) and Polyether Diol Zinc chloride (37.5 g) is dissolved in distilled water (137.5 mL) and t-butyl alcohol (25 mL) to give Solution 1. Solution 2 is made by dissolving potassium hexacyanocobaltate (3.75 g) in distilled water (50 mL). Solution 3 is made by dissolving a 1000 molecular weight poly(oxypropylene) diol (4.0 g) in distilled water (25 mL) and t-butyl alcohol (5.0 mL). Solution 2 is added to Solution 1 over 15 min. at 50° C. while homogenizing the mixture at 20% of maximum mixing intensity. Mixing intensity is increased to 40% for the next 10 min. of mixing. The homogenizer is stopped. Solution 3 is added to the mixture, which is stirred magnetically for 3 min., and is then pressure filtered through a 20 micron filter at 40 psig. The filter cake is reslurried in t-butyl alcohol (65 mL), and distilled water (27.5 mL), and the mixture is homogenized for 10 min. at 40% intensity. The homogenizer is stopped. Additional 1000 mol. wt. poly(oxypropylene) diol (1.0 g) is added, and the mixture is stirred magnetically for 3 min. The mixture is pressure filtered as described above. The filter cake is reslurried in t-butyl alcohol (92.5 mL) and poly(vinyl ethyl ether) (3.0 g), and is homogenized at 40% intensity for 10 min. The homogenizer is stopped. Additional 1000 mol. wt. poly(oxypropylene) diol (0.5 g) is added, and the mixture is stirred magnetically for 3 min. Filtration and isolation of the catalyst solids proceeds as previously described. The cake is dried under vacuum at 60° C. to constant weight. The dried catalyst is easily crushed to a free-flowing powder. The catalyst contains 18 wt. % of poly(vinyl ethyl ether) and polyether diol combined. Catalyst activity for propylene oxide polymerization is 21.7 g PO/min. at 25 ppm catalyst.

EXAMPLE 7

Catalyst Preparation: Zinc Hexacyanocobaltate/t-butyl alcohol Complex Containing a Polyester Polyol Zinc chloride solution (62.5 wt. % in water, 120 g) is combined with distilled water (230 mL) and t-butyl alcohol (50 mL) to give Solution 1. Potassium hexacyanocobaltate (7.5 g) is dissolved in distilled water (100 mL) to give Solution 2. Solution 3 is prepared by dissolving LEXOREZ 1080-55 polyol (condensation polymer from 2-methyl-1,3-propanediol and adipic acid, product of Inolex Chemical Co. 8.0 g) in water (50 mL) and t-butyl alcohol (2.0 mL). Solution 2 is added to solution 1 over 30 min. at 50° C. while homogenizing the mixture at 20% of maximum mixing intensity. Mixing intensity is increased to 40% for the next 10 min. of mixing. The homogenizer is stopped. Solution 3 is added to the mixture, which is stirred magnetically for 3 min., and is then pressure filtered through a 20 micron filter at 40 psig. The filter cake is reslurried in t-butyl alcohol (130 mL) and distilled water (55 mL), and the mixture is homogenized for 10 min. at 40% intensity. The homogenizer is stopped. Additional polyester polyol (2.0 g) is added, and the mixture is stirred magnetically for 3 min. The mixture is pressure filtered as described above. The filter cake is reslurried in t-butyl alcohol (185 mL) and is homogenized at 40% intensity for 10 min. The homogenizer is stopped. Additional polyester polyol (1.0 g) is added, and the mixture is stirred magnetically for 3 min. Filtration and isolation of the catalyst solids proceeds as previously described. The cake is dried under vacuum at 60° C. to constant weight. The dried catalyst is easily crushed to a free-flowing powder. The catalyst contains 5.0 wt. % of polyester polyol. Catalyst activity for propylene oxide polymerization is 19.2 g PO/min. at 20 ppm catalyst.

EXAMPLE 8

Catalyst Preparation: Zinc Hexacyanocobaltate/t-butyl alcohol Complex Containing Poly(1-vinylpyrrolidone)

Zinc chloride solution (120 g of 62.5 wt. % ZnCl$_2$ in water) is dissolved in distilled water (230 mL) and t-butyl alcohol (50 mL) to give Solution 1. Solution 2 is made by dissolving potassium hexacyanocobaltate (7.5 g) in distilled water (100 mL). Solution 3 is made by mixing poly(1-vinylpyrrolidone) (8.0 g) with distilled water (50 mL) and t-butyl alcohol (2.0 mL). Solution 2 is added to Solution 1 over 30 min. at 50° C. while homogenizing the mixture at 20% of maximum mixing intensity. Mixing intensity is increased to 40% for the next 30 min. of mixing. The homogenizer is stopped Solution 3 is added to the mixture, which is stirred magnetically for 3 min., and is then pressure filtered through a 20 micron filter at 40 psig. The filter cake is reslurried in t-butyl alcohol (130 mL) and distilled water (55 mL), and the mixture is homogenized for 10 min. at 40% intensity. The homogenizer is stopped. Additional poly(1-vinylpyrrolidone) (2.0 g) is added, and the mixture is stirred magnetically for 3 min. The mixture is pressure filtered as described above. The filter cake is reslurried in t-butyl alcohol (185 mL) and is homogenized at 40% intensity for 10 min. The homogenizer is stopped. Filtration and isolation of the catalyst solids proceeds as previously described. The cake is dried under vacuum at 60° C. to constant weight. The dried catalyst is easily crushed to a free-flowing powder. The catalyst contains 22 wt. % of poly(1-vinylpyrrolidone). Catalyst activity for propylene oxide polymerization is 14.7 g PO/min. at 20 ppm catalyst.

COMPARATIVE EXAMPLE 9

Catalyst Preparation: Zinc Hexacyanocobaltate/t-butyl alcohol Complex Containing Polyether Polyol Zinc chloride (283.5 g) is dissolved in distilled water (1039 mL) and t-butyl alcohol (189 mL) to produce Solution 1. Solution 2 is made by dissolving potassium hexacyanocobaltate (28.35 g) in distilled water (378 mL). Solution 3 is made by mixing poly(oxypropylene) diol (1000 molecular weight, 30.2 g) with distilled water (180 mL) and t-butyl alcohol (7.6 mL). Solution 2 is added to Solution 1 over 1 h at 50° C. with stirring at 450 rpm. Following addition, the stirring rate is increased to 900 rpm for 1 h under 10 psig of nitrogen. The stirring rate is then dropped to 450 rpm. Solution 3 is added, and the mixture is stirred for 3 min. Solids are isolated by pressure filtration through a 20 micron filter at 40 psig. The filter cake is reslurried in a mixture of distilled water (201 mL) and t-butyl alcohol (492 mL), and is stirred at 900 rpm for 1 h. The stirring rate is dropped to 450 rpm, and additional 1000 mol. wt. poly(oxypropylene) diol (7.6 g) is added. After mixing for 3 min., the solids are isolated as described above. The filter cake is reslurried in t-butyl alcohol (700 mL) and mixed at 900 rpm for 1 h. The stirring rate is dropped to 450 rpm, and additional 1000 mol. wt. poly(oxypropylene) diol (3.8 g) is added. After mixing for 3 min., the solids are isolated and dried at 60° C. under vacuum to constant weight. The dried catalyst is easily crushed to a free-flowing powder. Catalyst activity for propylene oxide polymerization is 20 g PO/min. at 25 ppm catalyst. FIG. 1 shows a powder X-ray diffraction pattern for this catalyst.

COMPARATIVE EXAMPLES 10 and 11

Catalyst Preparation: Zinc Hexacyanocobaltate/t-butyl alcohol Complex Prepared Without a Functionalized Polymer Potassium hexacyanocobaltate (8.0 g) is dissolved in distilled water (300 mL) and t-butyl alcohol (50 mL) to give Solution 1. Solution 2 is made by dissolving zinc chloride (75 g) in distilled water (75 mL). Solution 2 is added to Solution 1 over 30 min. with homogenization at 20% of maximum mixing intensity. After the addition is complete, the mixture is homogenized at 40% of maximum intensity for 10 min. The mixture is centrifuged at 17,000 rpm for 30 min. to isolate the solids. The solids are reslurried in t-butyl alcohol (155 mL) and distilled water (55 mL). The mixture is homogenized at 40% intensity for 10 min. and is then centrifuged as described above. The solids are reslurried in t-butyl alcohol (185 mL), homogenized at 40% intensity for 10 min., and isolated. The catalyst is dried under vacuum at 60° C. to constant weight. The dried catalyst is pulverized (difficult) to give a free-flowing powder.

Catalyst activity for propylene oxide polymerization is 17.9 g/min at 50 ppm catalyst (Comparative Example 10), and 9.3 g PO/min. at 20 ppm catalyst (Comparative Example 11). FIG. 1 shows a powder X-ray diffraction pattern for this catalyst.

EXAMPLE A

Epoxide Polymerizations: Rate Experiments-General Procedure

A one-liter stirred reactor is charged with polyoxypropylene triol (700 mol. wt.) starter (70 g) and polymer-containing zinc hexacyanocobaltate catalyst (0.0114 to 0.057 g, 20–100 ppm level in finished polyol). The mixture is stirred and heated to 105° C., and is stripped under vacuum to remove traces of water from the triol starter. The reactor pressure is adjusted to a vacuum of about 30 in. (Hg), and propylene oxide (10–11 g) is added in one portion. The reactor pressure is then monitored carefully. Additional propylene oxide is not added until an accelerated pressure drop occurs in the reactor; the pressure drop is evidence that the catalyst has become activated. When catalyst activation is verified, the remaining propylene oxide (490 g) is added gradually to keep the reactor pressure at about 10 psig. After propylene oxide addition is complete, the mixture is held at 105° C. until a constant pressure is observed. Residual unreacted monomer is then stripped under vacuum from the polyol product, and the polyol is cooled and recovered.

EXAMPLE B

Polyether Polyol Synthesis: 8000 Mol. Wt. Polyoxypropylene Diol

A one-liter stirred reactor is charged with polyoxypropylene diol (725 mol. wt.) starter (65 g) and zinc hexacyanocobaltate catalyst (0.0173 g, 25 ppm). The mixture is stirred and heated to 130° C., and is stripped under vacuum for 0.5 h at 130° C. to remove traces of water from the diol starter. Propylene oxide (12 g) is fed to the reactor, initially under a vacuum of about 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (618 g) is added gradually over 2 to 6 h (see Table 1). After propylene oxide addition is complete, the mixture is held at 130° C. until a constant pressure is observed. Residual unreacted monomer is then stripped under vacuum at 80° C. from the polyol product. (See Examples 1–8 and Comparative Examples C9–C11).

The preceding examples are meant only as illustrations; the following claims define the scope of the invention.

TABLE 1

DMC Catalysts Containing Functionalized Polymers:
Effect of Polymer Additive on Catalyst Activity and Polyol Properties

| Ex. # | Functionalized polymer additive | Catalyst activity: 6K triol prep. (105° C., 10 psig) | | Polyol Properties (8K poly(oxypropylene) diol made at 130° C. using 25 ppm catalyst) | | | | |
|---|---|---|---|---|---|---|---|---|
| | | Catalyst (ppm) | Polymerization rate (g PO/min) | PO add. time (h) | Viscosity (cps) | Mw/Mn | Unsat. (meq/g) | HMW Tail[3] (ppm) |
| 1 | poly(N,N-dimethylacrylamide) | 100 | 23.8 | 6 | 3510 | 1.19 | 0.0054 | — |
| 2 | poly(vinylpyrrolidone) | 25 | 12.2 | 2 | 5210 | 1.19 | 0.0054 | 4670 |
| 3 | poly(vinylpyrrolidone-co-acrylic acid) | 20 | 17.2 | 2 | 8220 | 1.23 | 0.0045 | 6050 |
| 4 | poly(vinyl methyl ether) | 25 | 25.0 | 4 | 3150 | 1.14 | 0.0076 | 1210 |
| 5 | poly(vinyl methyl ether)/polyether diol | 25 | 17.9 | 4 | 3510 | 1.08 | 0.0058 | 1010 |
| 6 | poly(vinyl ethyl ether)/polyether diol | 25 | 21.7 | 4 | 3450 | 1.08 | 0.0056 | 1520 |
| 7 | LEXOREZ 1080-55 polyester polyol[1] | 20 | 19.2 | 2 | 4380 | 1.14 | 0.0044 | 3580 |
| 8 | poly(vinylpyrrolidone) | 20 | 14.7 | 2 | 4510 | 1.15 | 0.0045 | 3770 |
| C9 | poly(oxypropylene) diol 1000 mw | 25 | 20.0 | 4 | 3360 | 1.16 | 0.0060 | 2000 |
| C10 | no additive[2] | 50 | 17.9 | 4 | 4150 | 1.23 | 0.0067 | — |
| C11 | no additive[2] | 20 | 9.3 | 2 | 17000 | 1.35 | 0.0064 | 9260 |

[1]Product of Inolex Chemical Co.--condensation polymer from 2-methyl-1,3-propanediol and adipic acid.
[2]Gel formation is observed during 8K diol synthesis with this catalyst.
[3]High molecular weight tail is the estimated amount (in ppm) of polyol having peak molecular weight > 100,000 as measured by gel permeation chromatography using polystyrene standards.

To determine reaction rate, a plot of PO consumption (g) vs. reaction time (min) is prepared. The slope of the curve at its steepest point is measured to find the reaction rate in grams of PO converted per minute. The intersection of this line and a horizontal line extended from the baseline of the curve is taken as the induction time (in minutes) required for the catalyst to become active. Measured reaction rates are summarized in Table 1.

When this procedure is used to measure propylene oxide polymerization rates, the catalysts of the invention typically polymerize PO at rates in excess of about 15 g/min at 20 ppm catalyst at 105° C. The epoxide polymerization rates for the catalysts of the invention are consistently higher than similar catalysts prepared in the absence of a functionalized polymer (see Comparative Example 11).

I claim:
1. A catalyst which comprises:
 (a) a double metal cyanide compound;
 (b) an organic complexing agent; and
 (c) from about 2 to about 80 wt. % of a functionalized polymer other than a polyether, or a water-soluble salt of the functionalized polymer, wherein the functionalized polymer has the general structure:

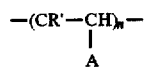

in which R' is hydrogen, —COOH, or a $C_1$–$C_5$ alkyl group, and A is one or more functional groups selected from the group consisting of —OH, —NH$_2$, —NHR, —NR$_2$, —SH, —SR, —COR, —CN, —Cl, —Br, —C$_6$H$_4$—OH, —C$_6$H$_4$—C(CH$_3$)$_2$OH, —CONH$_2$, —CONHR, —CO—NR$_2$, —OR, —NO$_2$, —NHCOR, —NRCOR, —COOH, —COOR, —CHO, —OCOR, —COO—R—OH, —SO$_3$H, —CONH—R—SO$_3$H, pyridinyl, and pyrrolidonyl, in which R is a C$_1$–C$_5$ alkyl or alkylene group, and wherein n has a value within the range of about 5 to about 5,000; and wherein the catalyst is substantially non-crystalline by powder X-ray diffraction analysis.

2. The catalyst of claim 1 wherein n has a value within the range of about 10 to about 500.

3. The catalyst of claim 1 wherein the double metal cyanide compound is a zinc hexacyanocobaltate.

4. The catalyst of claim 1 wherein the organic complexing agent is tert-butyl alcohol.

5. A catalyst which comprises:

(a) a zinc hexacyanocobaltate;

(b) t-butyl alcohol; and (c) from about 2 to about 80 wt. % of a functionalized polymer other than a polyether, or a water-soluble salt of the functionalized polymer, said functionalized polymer having the general structure:

in which R' is hydrogen, —COOH, or a C$_1$–C$_5$ alkyl group, and A is one or more functional groups selected from the group consisting of —OH, —NH$_2$, —NHR, —NR$_2$, —SH, —SR, —COR, —CN, —Cl, —Br, —C$_6$H$_4$—OH, —C$_6$H$_4$—C(CH$_3$)$_2$OH, —CONH$_2$, —CONHR, —CO—NR$_2$, —OR, —NO$_2$, —NHCOR, —NRCOR, —COOH, —COOR, —CHO, —OCOR, —COO—R—OH, —SO$_3$H, —CONH—R—SO$_3$H, pyridinyl, and pyrrolidonyl, in which R is a C$_1$–C$_5$ alkyl or alkylene group, and wherein n has a value within the range of about 5 to about 5,000; and wherein the catalyst is substantially non-crystalline by powder X-ray diffraction analysis.

6. A catalyst which comprises:

(a) a double metal cyanide compound;

(b) an organic complexing agent; and (c) from about 2 to about 80 wt. % of a functionalized polymer other than a polyether, or a water-soluble salt of the functionalized polymer, wherein the functionalized polymer is selected from the group consisting of polyesters, polycarbonates, oxazoline polymers, polyalkylenimines, maleic acid and maleic anhydride copolymers, hydroxyethyl cellulose, starches, and polyacetals.

7. A catalyst which comprises:

(a) a zinc hexacyanocobaltate;

(b) t-butyl alcohol; and (c) from about 2 to about 80 wt. % of a functionalized polymer other than a polyether, or a water-soluble salt of the functionalized polymer, wherein the functionalized polymer is selected from the group consisting of polyesters, polycarbonates, oxazoline polymers, polyalkylenimines, maleic acid and maleic anhydride copolymers, hydroxyethyl cellulose, starches, and polyacetals.

8. The catalyst of claim 5 wherein has a value within the range of about 10 to about 500.

* * * * *